United States Patent [19]

Wilkinson et al.

[11] Patent Number: 5,688,870

[45] Date of Patent: Nov. 18, 1997

[54] PROCESS FOR PREPARING WATER DISPERSIBLE POLYMER POWDERS

[75] Inventors: Steven Paul Wilkinson, Coopersburg; Lloyd Mahlon Robeson, Macungie, both of Pa.

[73] Assignee: Air Products and Chemicals, Inc., Allentown, Pa.

[21] Appl. No.: 630,396

[22] Filed: Apr. 10, 1996

[51] Int. Cl.⁶ .................... C08F 2/00; C08F 26/08
[52] U.S. Cl. .................... 525/244; 525/73; 526/201
[58] Field of Search .................... 525/244, 73; 526/201

[56] References Cited

U.S. PATENT DOCUMENTS

| | | | |
|---|---|---|---|
| 4,748,220 | 5/1988 | Hartmann et al. | 526/89 |
| 4,933,404 | 6/1990 | Beckman et al. | 526/207 |
| 5,312,882 | 5/1994 | DeSimone et al. | 526/201 |
| 5,328,972 | 7/1994 | Dada et al. | 526/227 |
| 5,382,623 | 1/1995 | DeSimone et al. | 524/557 |
| 5,441,994 | 8/1995 | Moriga et al. | 523/201 |
| 5,527,865 | 6/1996 | DeSimone et al. | 526/89 |

FOREIGN PATENT DOCUMENTS 0301532  2/1989  European Pat. Off.

OTHER PUBLICATIONS

Piirma, I. *Encyclopedia of Polymer Science and Engineering*. Supplemental Volume. p. 127. John Wiley–and Sons, New York: 1989.

Sue, H. J., et al. "Optimization of Mode–I Fracture Toughness of High–Performance Epoxies by Using Designed Core–Shell Rubber Particles." *Toughened Plastics I: Science and Engineering*. American Chemical Society, ACS Series 223. Ed: Riew and Kinloch. Washington, DC: 1993.

Hoffmann, G. H. "Polymer Blend Modification of PVC." *Polymer Blends and Mixtures*. p. 128. Ed: Walsh, Higgins, Maconnachie. NATO ASI Series, Series E: Applied Sciences—No. 89. Martinus Nijhoff Publishers, Lancaster, PA: 1985.

Silverstein, M. S. et al. "Latex Interpenetrating Polymer Network Domain Elastomers." *Advances in Interpenetrating Polymer Networks*. vol. 1, p. 117. Ed: Klemper and Frisch. Techanamic Pub. Co., Inc., Lancaster, PA: 1989.

DeSimone, J. M. "Synthesis of Fluoropolymers in Supercritical Carbon Dioxide." *Science*. vol. 257. p. 945. 14 Aug. 1992.

Adamsky, F. A. "Inverse Emulsion Polymerization of Acrylamide in Supercritical Carbon Dioxide." *Macromolecules*. vol. 27. p. 312. American Chemical Society: 1994.

DeSimone, J. M. "Dispersion Polymerization in Supercritical Carbon Dioxide." *Science*, vol. 265. p. 356. 15 Jul. 1994.

*Primary Examiner*—Irina S. Zemel
*Attorney, Agent, or Firm*—Mark L. Rodgers

[57] ABSTRACT

Water dispersible polymeric powders are prepared in liquid/supercritical $CO_2$ by the sequential polymerization of a water soluble polymer after the polymerization of a non-water soluble polymer using core-shell polymerization technology.

9 Claims, No Drawings

PROCESS FOR PREPARING WATER DISPERSIBLE POLYMER POWDERS

TECHNICAL FIELD OF THE INVENTION

The present invention relates to the formation of water dispersible polymer powders.

BACKGROUND OF THE INVENTION

Heterogeneous polymerization processes are widely practiced in industry for free radical polymerization. These processes produce a wide range of commercial products including coatings, adhesives, sealants, superadsorbents etc. The major free radical heterogeneous polymerization processes involve emulsion polymerization of vinyl acetate based homopolymer and copolymers and acrylate based homopolymers and copolymers in water to produce a myriad of water based coatings, adhesives and sealants. In addition to emulsion based systems, suspension polymerization processes are also widely practiced employing water as a media for conducting heterogeneous polymerization. Water as a polymerization media offers many advantages including non-toxic, low cost, environmentally benign, non-flammable, high thermal conductivity, high specific heat, thermal stability, and no chain transfer from the propagating polymer to water. Additionally with the many decades of technology development, a number of surfactants exist to conduct various polymerizations in water.

Core-shell technology is commonly practiced in water based emulsion polymerization. Piirma noted preparation of core-shell polymers produced by initial polymerization of one polymer (core) followed by subsequent polymerization of another polymer (shell). (I. Piirma, in Encyclopedia of Polymer Science and Engineering, Supplement Volume, p. 127, John Wiley & Sons, New York, 1989). It was noted that acrylonitrile-butadiene-styrene (ABS) is an example of core-shell technology produced in an emulsion polymerization process. Sue et. al. noted the use of core-shell rubber particles for toughening epoxies (H. J. Sue, E. I. Garcia-Meitin, D. M. Pickelman, and P. C. Yang, in Toughened Plastics I: Science and Engineering, edited by C. K. Riew and A. J. Kinloch, ACS Series 233, American Chemical Society, Washington, D.C., 1993). These core-shell particles were produced by a two-stage latex polymerization in water. Acrylates sequentially polymerized in the presence of rubber particles are commercially employed as impact modifiers for the huge PVC molding and extrusion markets including pipe and house siding. These impact modifiers have been discussed by G. H. Hofmann (in Polymer Blends and Mixtures, edited by D. J. Walsh, J. S. Higgins, and A. Maconnachie, p. 128, NATO ASI Series, Series E: Applied Sciences—No. 89, Martinus Nijhoff Publishers, Lancaster, Pa. (USA), 1985). Silverstein and Narkis (M. S. Silverstein and M. Narkis in Advances in Interpenetrating Polymer Networks, Vol. 1., ed. by D. Klempner and K. C. Frisch, p. 117, Technomic Pub. Co. Inc., Lancaster, Pa. (USA), 1989 discuss a two-stage latex polymerization procedure to produce core-shell particles also referred to as interpenetrating polymer networks.

There are many cases where water cannot be employed as the polymerization media. These cases can include water reactive monomers (e.g. isocyanates), polymerization of water soluble monomers (for those cases where heterogeneous polymerization is desired), as well as specific structures incapable of being polymerized in water.

It has been demonstrated recently that supercritical $CO_2$ can be employed as a media for heterogeneous polymerization (J. DeSimone et. al. (Science; 257, 945 (1992)). Super-critical (or liquid) $CO_2$ offers specific advantages as a reaction media including low cost, non-toxic, non-flammable, environmentally benign and acceptable ($CO_2$ can be derived from sources such as flue gas which already exist—thus additional $CO_2$ need not be created to satisfy any demand for this process). $CO_2$ does not result in free radical chain transfer from growing polymer chain, exhibits very low solubility of almost all polymers (thus heterogeneous polymerization), and can be used as an extraction solvent for removal of unreacted monomer, low molecular weight oligomers, initiators fragments, and unfavorable low molecular weight products at the completion of the reaction. The key to this technology was the recognition that $CO_2$-philic surfactants could be designed to allow for control of heterogeneous polymerization such that small and controllable particle sizes could be achieved. This is important as without a proper surfactant system precipitation polymerization could occur with particle coagulation leading to an uncontrollable process and the inability to recover fine particles as is desired in the subject invention. The use of fluorocarbon and siloxane based surfactants have been described in U.S. Pat. Nos. 5,312,882 and U.S. Pat. No. 5,382,623. Precipitation polymerization in liquid or super-critical $CO_2$ has been known for several decades including patent references (Hartmann et al, U.S. Pat. No. 4,748,220; Dada et al, U.S. Pat. No. 5,328,972 and European Patent Applications EPO 301532). Beckman et al, U.S. Pat. No. 4,933,404 described the use of a supercritical fluid to conduct the inverse emulsions of water soluble polymers. Examples included polymerization of acrylamide in ethane-propane mixtures with water added. Surfactants were employed to stabilize the polymerization and prevent precipitation during the polymerization process.

Adamsky and Beckman, Macromolecules, 27, 312 (1994), describe the inverse emulsion polymerization of acrylamide in supercritical $CO_2$. In this case, water was added to the $CO_2$/acrylamide mixture. An amide end-capped poly(hexafluoropropylene oxide) surfactant was employed as a protective colloid stabilizer.

DeSimone et al, Science, 265, 356 (1994), disclose the use of core-shell technology in conjunction with polymerization in $CO_2$. The areas where core-shell may be applicable to heterogeneous polymerization processes in supercritical/liquid $CO_2$ were not disclosed in any of these references.

An area of increasing importance for water based emulsions involves redispersible powders. Redispersible powders are initially prepared in water and then recovered as dry powders via coagulation (e.g. salt addition) or by spray drying. The resultant powders are then redispersed in water for application end-use. Typical applications for redispersible polymeric powders include concrete, ceramic tile grout, adhesive grouts, mortar compounds, and the like. Polymer powders are advantageous in cases where storage as an emulsion may be limited by the storage life, heat, freeze/thaw cycles, etc. The powder could be stored indefinitely if kept under reasonably dry conditions. Also, shipment of emulsions involves shipment of large quantities of water and dry powder shipment may be preferred for economic reasons. Nowhere in the art is it taught that powders produced in $CO_2$ would be redispersible, and in fact, the typical products produced in the technology disclosed by DeSimone are highly non-dispersible in water as would be expected based on the utility of fluorocarbon or siloxane surfactant systems which remain at the surface of the particle upon removal of $CO_2$. Thus, while polymerization in $CO_2$ is amenable to recovery of dry particles, the state-of-the-art does not teach or disclose methods to make such particles redispersible in water. In fact, one skilled in the art would expect that the surfactants required for $CO_2$ would result in highly non-water dispersible particles and indeed, that is the case with the prior art processes.

SUMMARY OF THE INVENTION

The present invention is a method whereby water dispersible powders can be prepared in liquid/supercritical $CO_2$. We have found that sequential polymerization of a water soluble polymer after the polymerization of a non-water soluble polymer can result in a powder which can be redispersed in water even though it was initially prepared in a liquid/supercritical $CO_2$ environment.

DETAILED DESCRIPTION OF THE INVENTION

We have demonstrated the production of fine polymeric powders/particles in liquid/supercritical $CO_2$ employing $CO_2$-philic surfactants by post polymerization of a water soluble or water dispersible polymer shell on the core of the desired powder/particle. Even though the particles can be suspended in a $CO_2$ environment, they can also be redispersible in a water environment. This concept of sequential polymerization of a water soluble polymer does not work in a water-based emulsion polymerization process since the water soluble polymer polymerizes in the water phase and greatly increases the viscosity. In $CO_2$, the water soluble polymer can polymerize in or on the surface of the prepolymerized polymer particle or on particle clusters.

The subject invention comprises the polymerization in liquid or supercritical $CO_2$ of a core polymer which is not water soluble. Examples include: polymers based on acrylic monomers such as, acrylate esters including methyl methacrylate, ethyl methacrylate, n-butyl methacrylate, 2-ethyl hexylmethacrylate, methylacrylate, ethyl acrylate, n-butyl acrylate and 2-ethyl hexylacrylate; polymers and copolymers based on styrene monomers, including homopolymer polystyrene, styrene-butadiene, styrene-isoprene, styrene-acrylate esters, and styrene-acrylonitrile copolymers. Vinyl ester homopolymers and copolymers are also contemplated in this invention including vinyl acetate, vinyl acetate-ethylene copolymers, vinyl proprionate, vinyl versatate and the like. The acrylate esters, vinyl esters, and styrenic based polymers can also contain other comonomers not mentioned above such as acrylic acid, methacrylic acid, maleic acid, maleic anhydride, N-vinyl formamide, acrylamide, and the like. Vinyl chloride polymers and copolymers, as well as polymers based on olefinic and fluoroolefinic monomers can also be used.

Polymerization of the core involves the addition of monomers to either liquid or supercritical $CO_2$ along with an initiator. A $CO_2$-philic surfactant is also added to stabilize the reaction mixture such that precipitation polymerization does not occur. Initiators common to those employed in water based emulsion, dispersion, or suspension polymerization as well as in inverse emulsion or non-aqueous dispersion polymerizations can be employed. Examples of such initiators include: azo compounds; peroxides such as benzoyl peroxide, cumyl and t-butyl hydroperoxide, t-butyl perbenzoate, methyl ethyl ketone peroxide, t-amyl peroctoate, di(2-ethyl hexyl) peroxydicarbonate, 1,1-dimethyl-3-hydroxy-butyl-peroxyneoheptanoate; azobisisobutyronitrile, as well as redox initiators. The decomposition of benzoyl peroxide with a tertiary amine such as dimethyl aniline is an example of a non-aqueous redox system. Hydrogen peroxide in combination with ferrous ions is an example of redox initiation. Ferrous (Fe(+2),Cr(+2), V(+2), Ti(+3), Co(+2), and CU(+) can also be employed with organic peroxides. Reductants such as $HSO_3$ (-), $SO_3$(-2), $S_2O_5$(-2) and $S_2O_3$(-2) in combination with oxidants (Cu(+2), $H_2O_2$, Ag(+), Fe(+3) and the like can be employed for redox initiation.

The surfactants (protective colloid stabilizers) are chosen to yield the desired particle formation during polymerization. Such surfactants exhibit a $CO_2$-philic and a lipophilic characteristic. In this case lipophilic relates to the core polymer. Suitable surfactants include reactive and non-reactive fluorocarbon oligomers and polymers such as poly (1,1-dihydroperfluorooctyl acrylate), fluoroether copolymers, fluorocarbon macromers, and the like. Reactive and non-reactive siloxane containing oligomers and polymers can also be employed, with examples including siloxane block and graft copolymers such as a silicone rubber-poly(ethylene oxide) block or graft copolymer. Siloxane macromers capable of copolymerizing with the core monomer(s) are of particular interest. Macromers comprising a $CO_2$-philic chain with a terminal vinyl group allow for the in-situ formation of the desired surfactant. Reactive and non-reactive poly(propylene oxide) oligomers and polymers, as well as, block and graft copolymers can also be employed as they have been noted to exhibit $CO_2$-philic tendencies.

The polymerization can be conducted with $CO_2$ in the liquid state below the critical temperature (31° C.) or in the supercritical state. The pressure in the supercritical state can be varied during the reaction if desired. The monomers for the core can be added initially, added after introduction of the $CO_2$ or optionally added along with initiator continuously. The continuous addition of monomers is preferred particularly if the process is heat transfer limiting. This method of addition allows for better control of the reaction and thus a more uniform product produced therein. In the case of copolymers employed for the core, one monomer can be delivered to the reaction in a delay feed method. This procedure allows for a more uniform copolymer to be produced. This is important when the reactivities of the monomers are different.

The shell of the particle comprises a water-soluble or water dispersible polymer. The shell is formed by sequential polymerization of a monomer capable of yielding the desired water dispersibility. Preferred monomers include acrylic acid, methacrylic acid, acrylamide, N-vinyl formamide, N,N-dimethyl acrylamide, N-vinyl pyrrolidone, aziridine and diacrylamide. Other monomers of interest include maleic acid, maleic anhydride, esters of maleic anhydride, crotonic acid, p-styrene sulfonic acid, vinyl sulfonic acid, vinyl phosphonic acid, 2-acrylamido-2-ethylpropane sulfonic acid, 3-acrylamido-3-methylbutanoic acid, diallyldimethylammonium chloride, diallyldiethylammonium chloride, diethylaminoethyl methacrylate, methacryloyloxyethyltrimethylammonium chloride, 4-vinyl pyridine, 2-vinyl pyridine and the like. These monomers can be utilized as homopolymers or as copolymers with other monomers which yield water soluble or dispersible polymers. The level of monomers (which yield water insoluble polymers) which can be added will depend on the resultant dispersibility of the polymerized system. An additional variant of this process includes utilizing poly(vinyl acetate) or vinyl acetate copolymers as the shell and hydrolyzing the poly(vinyl acetate) (via conventional acid or base hydrolysis) either in-situ in the $CO_2$ or after removal from the reactor.

Polymerization of the shell will be conducted after the core polymerization in the preferred embodiment. The monomer(s) comprising the shell polymer are added to the $CO_2$-core polymer mixture along with the desired initiator system either in a batch type mode or in a continuous feed mode. Another method contemplated in this invention will be to feed the shell monomer(s) in a mode where the concentration of the shell monomer(s) continues to increase relative to the monomer(s) comprising the core polymer. This will produce a graded structure with the initial core polymer formed followed by the formation of intermediate structure and finally the formation of the shell polymer. This method allows for a more uniform structure of the resultant particle. Additional surfactants can be added with the polymerization of the shell polymer. Additionally water may also be added with the addition of the shell monomer(s).

The resultant polymer can be recovered as a powder by spraying the heterogeneous mixture out of the reactor to be collected as a dry powder or optionally can be sprayed into a water solution. The pH of the water can be varied in order to increase the dispersibility of the powders produced by this method. For anionic polymers comprising the shell polymer the pH will be on the basic side to achieve the best dispersibility and the reverse will be the case for cationic polymers.

These redispersible powders are useful for addition to water based coatings, adhesives, sealants, caulks, and the like, as well as for use in concrete/cement modifications. These powders are also useful for water based inks and toner particles for paper applications, and can be added to water based epoxy and urethane formulations for impact modification. The addition of these powders to water based construction products such as plaster and mortar based products is also contemplated in this invention.

EXPERIMENTAL

The following examples are presented to better illustrate the present invention and are not meant to be limiting.

Example 1

Methyl methacrylate (50 g), and a reactive surfactant (polydimethyl siloxane monomethacrylate (0.5 g)) were mixed together with an AIBN initiator, (Vazo-67-Dupont 0.25 g) and the mixture purged with nitrogen. The reagent mixture was added to a monomer feed vessel ready to be pumped into the high pressure reactor.

A 300 cc Autoclave Engineers high pressure reactor fitted with a Magna drive stirrer and the appropriate relief valves, rupture discs, pressure transducers and inlet ports was pressure checked with high pressure nitrogen at 500 psi intervals up to 4000 psi. Following a successful pressure check, the nitrogen was vented to leave approximately 50 psi of nitrogen pressure inside the reactor. Carbon dioxide was then used to purge the reactor three times. Each $CO_2$ purge consisted of opening the $CO_2$ valve from the ISCO Model 260D high pressure syringe pump to obtain ~500 psi of $CO_2$ pressure within the reactor. The $CO_2$ pressure was again vented to 50 psi to thoroughly purge the reactor system. With the ISCO $CO_2$ syringe pump running in the constant pressure mode and set to 5200 psi, (at ambient temperatures $CO_2$ density is equal to ~1.0 g/cc), approximately 232 g of $CO_2$ was charged to the reactor. Using a Thermal Separations high pressure pump the reagent mixture (located in a glass monomer feed vessel hung from a load cell) was pumped into the reactor with the agitator in constant motion. A total of 30.36 g of reagent mixture was added, the pressure drop was monitored to decrease from 2068 psi to 1675 psi at 29° C. The reactor temperature was increased to 65° C. This corresponded to a final run pressure of 4056 psi. The reaction was maintained at this temperature and pressure conditions for 16 hours. The reactor was then cooled to liquid $CO_2$ conditions (29° C. and 2040 psi) with constant agitation.

A second reagent mixture was prepared which would form the "shell" around the poly(methyl methacrylate) core. The second reagent mixture consisted of N-vinyl formamide (50 g) and the initiator AIBN (Dupont Vazo 67—0.25 g). This mixture was purged with nitrogen and fed to a second monomer feed vessel. Again, utilizing the Thermal Separation high pressure feed pump, reagent was added to the reactor, (3.12 g at 29° C. and 2040 psi). The reactor temperature was raised to polymerize the N-vinyl formamide(NVF) at 65° C. This reaction was left for 6 hours at 65° C. and 4190 psi. On completing the core-shell reaction process the $CO_2$ was vented and a fine white powder collected. The recovery yield was 85.3%.

Example 2

To further demonstrate the core-shell concept of particle redispersibility, a poly (methyl methacrylate) particle was prepared as the core and a shell of acrylic acid was polymerized to aid in the powder redispersibility when exposed to a basic media.

As described in Example 1, poly(methyl methacrylate) was polymerized in a 300 cc Autoclave Engineers reactor. The reagents methyl methacrylate(50.26 g), poly (dimethyl siloxane) macromonomer (2.50 g) and AIBN initiator (Dupont Vazo 67—1.00 g) were mixed, purged with nitrogen and 29.74 g charged to the high pressure reactor. This reactor had been thoroughly leak tested and purged with sufficient $CO_2$ to attain 750 psi. Following the monomer addition the $CO_2$ content was further increased. At the set reaction temperature of 65° C. sufficient $CO_2$ had been added for the pressure to reach 3600 psi. These conditions were maintained for ~15 hours. After this time period the reactor was cooled and an acrylic acid/AIBN reagent mixture added to the reactor. Acrylic acid (10.0 g) and AIBN (Dupont—Vazo 67, 0.2 g) were mixed, purged with nitrogen and 3.38 g added to the reactor, at 36° C. and 1692 psi. This acrylic acid 'shell' polymerization was continued for ~6 hours at 65° C. and 3600 psi. The $CO_2$ was vented and a white powder recovered. A total yield of 80.22% was obtained.

Example 3

The 300 cc reactor as described in Example 1 was leak tested and purged thoroughly with nitrogen. 232 g of supercritical fluid grade (Air Products & Chemicals) $CO_2$ was added via an ISCO syringe pump to the reactor. A solution containing methylmethacrylate, 50 g (Aldrich Chemical Co.), 2,2' azobis (2-methyl butanenitrile), 0.25 g (Vazo 67 DuPont), and a poly(dimethylsiloxane) macromonomer, 2.5 g (Aldrich Chemical Co.), was prepared and purged with nitrogen. This reagent was added to a monomer feed unit and further added to the $CO_2$ reactor using a HPLC pump (Thermal Separations). In total 30.04 g were added to the reactor, with $CO_2$ pressure=1558 psi at 27° C., the temperature was raised to 65° C. to initiate the reaction which was allowed to polymerize for 16 hours. The pressure had dropped to 3655 psi during the course of the reaction.

A solution of N,N' dimethylacrylamide (Aldrich Chemical Co.) with 2,2' azobis (2-methyl butanenitrile), 0.125 g (Vazo 67 DuPont) was mixed and purged with nitrogen. This reagent (3.99 g) was added to the reactor that had been cooled to 28° C. The reactor temperature was increased and the shell polymer of N,N' dimethyl acrylamide was polymerized at 65° C. for 8 hours. The operating pressure maintained a constant pressure of 3600 psi. The $CO_2$ was vented and the resulting free flowing white powder collected. The recovered yield was 88%.

Example 4 (Comparative)

The following reaction was performed to prepare a control sample of the polymer "core" for comparisons of water redispersibility with the samples made in the previous Examples.

The 300 cc reactor as described in Example 1 was leak tested and purged thoroughly with nitrogen, after which 227.34 g of supercritical fluid grade (Air Products & Chemicals) $CO_2$ was added via an ISCO syringe pump to the reactor. A solution containing methylmethacrylate, 50 g (Aldrich Chemical Co.), 2,2' azobis (2-methyl butanenitrile), 0.25 g (Vazo 67 DuPont), and a poly(dimethylsiloxane) macromonomer, 2.5 g (Aldrich Chemical Co.), was prepared and purged with nitrogen. This reagent was added to a monomer feed unit and further added to the $CO_2$ reactor using a HPLC pump (Thermal Separations). The reagent mixture (30.11 g) was added to the reactor at a $CO_2$ pressure of 1100 psi at 30° C., and the temperature was raised to 65° C. to initiate the reaction which was allowed to polymerize for 15 hours. The pressure increased to ~4000 psi as the temperature was raised. After the desired reaction time, the reaction was cooled and the $CO_2$ vented. A fine white powder was recovered (yield=75%). The molecular weight was obtained via gel permeation chromatography (GPC), the number average molecular weight was 276 000 g/mole, the polydispersity was 2.65.

Example 5

In one final example a homopolymer of poly(methyl methacrylate) was synthesized in accordance with the general procedures set out in Example 4 above. A homopolymer of poly(N-vinyl formamide) was prepared by conventional free-radical polymerization. The two homopolymers were then mixed together in water.

Example 6

The water redispersibility of the core-shell powders made in Examples 1,2 and 3 were compared with the core powders prepared as described in Examples 4 and 5.

Powder (~1 g) was added to 100 ml of tap water in a conical flask containing a magnetic stirrer for each powder prepared as described in Examples 1, 2 and 3. The powder was found to fully redisperse in the tap water. In a second experiment poly methyl methacrylate powder polymerized as described in example 4 also in a $CO_2$ media was also added to tap water in a conical flask containing a magnetic stirrer. After rigorous overnight agitation the powder could not be redispersed in the water, thus proving that the core shell concept of coating a polymer particle with a water soluble polymer proves to be a viable means for obtaining water redispersibility. The following table summarizes the results.

| Powder | Core | Shell | Ability to Redisperse in $H_2O$ |
|---|---|---|---|
| 1 | PMMA | Poly N-vinyl formamide | Yes |
| 2 | PMMA | Poly acrylic acid | Yes |
| 3 | PMMA | Poly N,N' dimethyl acrylamide | Yes |
| 4 | PMMA | none | No |
| 5 | PMMA + poly NVF (two homopolymers added together in H20) | none | No |

To check the redispersibility of the powders in a highly basic media, particles prepared in Example 2 containing an acrylic acid shell (a 1.0 g sample) was added to 100 ml of tap water in a conical flask with 10 g of sodium hydroxide. The flask was agitated and the powders redispersibility compared to a control sample of poly(methyl methacrylate), in a sodium hydroxide solution of the same concentration. A clear distinction could be made between the PMMA/Acrylic acid core-shell powders and the PMMA control. The core shell polymer with acrylic acid as the shell redispersed in the basic media to a greater extent than the PMMA control. The control particles agglomerated together in one lump on the liquid surface, whereas the PMMA/Acrylic acid core shell material dispersed in the sodium hydroxide media. The basic media is an important test media for redispersible powders as many of these materials are intended for the construction industry and need to be redispersed in water of a high pH/due to the high lime concentrations.

Having thus described the present invention, what is now deemed appropriate for Letters Patent is set out in the following appended claims.

We claim:

1. A process for the production of a water dispersible polymeric powder comprising:

a) adding to a reactor a first monomer, an initiator, a $CO_2$-phillic surfactant, and liquid or supercritical $CO_2$ to form a non-water soluble core polymer; and b) subsequently adding a second monomer, along with an initiator, to the reactor containing liquid or supercritical $CO_2$ to form a water soluble or water dispersible shell polymer on the non-water soluble core polymer, thereby forming a core-shell polymer.

2. A process in accordance with claim 1 wherein said first monomer is selected from the group consisting of: styrene monomers, olefinic monomers, acrylic monomers, vinyl ester monomers, vinyl chloride, fluoroolefinic monomers, maleic anhydride monomers and mixtures thereof.

3. A process in accordance with claim 1 wherein said $CO_2$-philic surfactant is selected from the group consisting of: reactive and nonreactive fluorocarbon oligomers and polymers, reactive and nonreactive siloxane oligomers and polymers, reactive and nonreactive poly(propyleneoxide) oligomers and polymers, and mixtures thereof.

4. A process in accordance with claim 1 wherein said second monomer is selected from the group consisting of acrylic acid, methacrylic acid, acrylamide, N-vinyl formamide, N,N-dimethyl acrylamide, N-vinyl pyrrolidone, aziridine and diacrylamide to form a crosslinked hydrophilic shell.

5. A process in accordance with claim 1 wherein the initiator which is added with the first monomer is selected from the group consisting of: peroxides, azo compounds, peroxy esters, peroxy dicarbonates and redox initiators.

6. A process in accordance with claim 1 wherein a surfactant is added along with the second monomer.

7. A process in accordance with claim 1 wherein said core-shell polymer is sprayed from the reactor and collected as a dry powder.

8. A process in accordance with claim 1 wherein said core-shell polymer is sprayed from the reactor into a water solution.

9. A process in accordance with claim 1 wherein said core shell polymer is recovered by venting the reactor.

* * * * *